US00RE40968E

(19) United States
(12) Reissued Patent
Tanaka

(10) Patent Number: US RE40,968 E
(45) Date of Reissued Patent: Nov. 10, 2009

(54) ENCODING AND DECODING APPARATUS OF LSP (LINE SPECTRUM PAIR) PARAMETERS

(75) Inventor: Naoya Tanaka, Osaka (JP)

(73) Assignee: Panasonic Corporation, Osaka (JP)

(21) Appl. No.: 09/948,181

(22) Filed: Nov. 2, 2001

Related U.S. Patent Documents

Reissue of:
(64) Patent No.: 5,802,487
Issued: Sep. 1, 1998
Appl. No.: 08/544,600
Filed: Oct. 18, 1995

(30) Foreign Application Priority Data

Oct. 18, 1994 (JP) ..... 6-252011

(51) Int. Cl.
*G10L 19/04* (2006.01)

(52) U.S. Cl. ..... 704/230; 704/279; 704/E19.25
(58) Field of Classification Search ..... 704/230, 704/219, 216, 217, 218, 220, 222, 223
See application file for complete search history.

(56) References Cited

U.S. PATENT DOCUMENTS

| | | | | | |
|---|---|---|---|---|---|
| 5,091,955 | A | * | 2/1992 | Iseda et al. | 704/230 |
| 5,097,507 | A | * | 3/1992 | Zinser et al. | 704/226 |
| 5,115,469 | A | * | 5/1992 | Taniguchi et al. | 704/228 |
| 5,224,167 | A | * | 6/1993 | Taniguchi et al. | 704/219 |
| 5,271,089 | A | * | 12/1993 | Ozawa | 704/222 |
| 5,371,853 | A | * | 12/1994 | Kao et al. | 704/200.1 |
| 5,487,128 | A | * | 1/1996 | Ozawa | 704/222 |
| 5,507,705 | A | * | 4/1996 | Hara | 477/108 |
| 5,704,001 | A | * | 12/1997 | Gardner | 704/219 |

FOREIGN PATENT DOCUMENTS

| | | | |
|---|---|---|---|
| EP | 0573398 | * | 12/1993 |
| EP | 0614075 | * | 9/1994 |

OTHER PUBLICATIONS

Kuo et al., "New LSP Encoding Method Based on Two–Dimensional Linear Prediction" IEEE Dec. 1993. vol. 140 pp. 415–419.*
Laroia et al., "Robust and Efficient Quantization of Speech LSP Parameters Using Structured Vector Quantizers", ICASSP '91, pp. 641–644.*
Pan et al., "Vector Quantizaiton of Speech LSP Parameters Using Trellis Codes and L1 Norm Constraints", ICASSP '93, pp. II17–II20.*
Kataoka et al., "An 8KBIT/S Speech Coder Based on Conjugate Structure Celp", ICASSP '93, pp. II592–II595.*
Naja et al., "Fast LSP Vector Quantization Algorithms Comparison", Mediterranean Electro Technical Conference, 1994, pp. 1127–2230.*
Ozawa et al., "M–CELP Speech Coding at 4kbps", ICASSP '94, pp. I269–I272.*
Laroia et al.; Robust and Efficient Quantization of Speech LSP Parameters Using Structured Vector Quantizers; ICASSP; 1991 pp. 641–644.*
* cited by examiner

*Primary Examiner*—Susan McFadden
(74) *Attorney, Agent, or Firm*—RatnerPrestia

(57) ABSTRACT

An encoding and decoding apparatus quantizes LSP (Line Spectrum Pair) parameters, which are characteristics parameters of spectrum information included in a voice signal, with high accuracy and stability. This encoding and decoding apparatus comprises a first quantizer in which quantization is performed independently in the unit of one frame, and a second quantizer which uses a correlation between adjacent frames. An error comparator compares quantization errors produced by the first quantizer and quantization errors produced by the second quantizer to select the one quantizer whose quantization errors are less than that of the other quantizer. The first quantizer produces a highly accurate quantization with stability regardless a condition of an input voice signal, while the second quantizer produces a highly accurate quantization when input voice signal stays quasi-stationary. By switching these two quantizers, this apparatus can offer stable and highly accurate quantization regardless of the condition of the input voice signal.

14 Claims, 5 Drawing Sheets

ENCODING AND DECODING APPARATUS OF LSP (LINE SPECTRUM PAIR) PARAMETERS

Matter enclosed in heavy brackets [ ] appears in the original patent but forms no part of this reissue specification; matter printed in italics indicates the additions made by reissue.

*This is a Reissue application of U.S. Pat. No. 5,802,487, issued Sep. 1, 1998.*

FIELD OF THE INVENTION

This invention relates to an encoding and decoding apparatus of LSP parameters which are characteristic parameters of spectrum information included in voice signals.

DESCRIPTION OF THE PRIOR ART

A main stream of the voice encoding apparatus which handles a signal of which bit rate ranging from 4 to 8 kbps is to separate spectrum information from voice source information through analyzing a voice signal before encoding them. The LSP parameter is a characteristic parameter indicating spectrum information. The LSP parameter, in general, uses 10 dimensions/frame, and one of the most fundamental method for encoding the LSP parameter is to handle each individual value as a scalar for quantization. However, since this method produces rather low quantization effect, a vector quantization which quantizes a plurality of LSP parameters in a mass is more frequently used. When utilizing a correlation between adjacent frames, the higher quantization effect can be gained because the LSP parameter has influential correlation with adjacent frames.

When using a conventional quantization apparatus which adopts the correlation between adjacent frames, an encoding and decoding can be achieved through the following steps:

1. Calculate the LSP parameter of a present frame from an input voice signal.

2. Calculate an error between the above calculated LSP parameter and a linear-predictive LSP parameter value which is predicted from the past quantized value stored in a buffer.

3. Select a code from a code book to minimize the error, and output the selected code.

4. A decoding means decodes the quantized value from the outputted code to store the quantized value into the buffer.

When an input voice signal stays quasi-stationary, the above conventional apparatus obtains high predictive gain to perform a highly accurate quantization. However, when an input voice signal is in transient state, predictive gain lowers and the accuracy of quantization also lowers. When a frame length is long, the transient factor between adjacent frames becomes large, which reduces the correlation between the frames. The predictive gain thus lowers. When the quantization method which adopts the correlation between frames for prediction is used, an input voice signal is hence supposed to stay quasi-stationary. This method is good at voice encoding when a frame length is short, but it does not produce a good result when a frame length is long.

Since the above conventional apparatus requires predicting a present value based on past quantized values, a code error produced in a transmission line influences not only the error frame but also the frames following. The conventional apparatus is thus vulnerable to errors.

SUMMARY OF THE INVENTION

The purpose of this invention is to overcome the problems entailed to the conventional apparatus: This invention offers an encoding and decoding apparatus of LSP parameters which can maintain a high accuracy of quantization even if an input voice signal is in transient state, and which also has higher resistance to errors.

In order to achieve the above purpose, this invention comprises:

a) a first quantizing means for independent vector quantization of LSP parameters of an input voice signal in each frame, b) a second quantizing means for vector quantization of LSP parameters of an input signal by using correlation between adjacent frames, c) an error comparison means for comparing quantization errors produced by the first quantizing means and the second quantizing means, and d) a switch for selecting one quantizing means which produces smaller error than the other quantizing means.

In other exemplary embodiment, first, the LSP parameters of the present frame are quantized by the second quantizing means into vector independently in the unit of one frame, second, a quantized value of the present frame is predicted based on the quantized value in the first step and the quantized value of the previous frame before quantizing a difference into vector between LSP parameters of the present frame and the predicted value.

Further in other exemplary embodiment, this invention has a detecting means for detecting errors produced on a quantization code in a transmission line. When a code of the next frame, an error was detected in the present frame, is produced by the first quantizing means (using a linear prediction analysis), a decoded quantized value is outputted. When a code is produced by the second quantizing means (using a correlation between adjacent frames), a quantized value from LSP parameters of each frame independently into vector is decoded and then outputted.

Further in other exemplary embodiment, this invention has, on the decoding side, error detecting means for detecting errors produced on a quantization code in a transmission line, and also has a judging means for judging whether a frequency of detecting errors is less than a threshold or not. When a error-detecting frequency on the decoding side is less than a threshold, the switch selects either one quantizing means which produces less errors of quantization. When the error-detecting frequency is not less than a threshold, the switch stays at the first quantizing means.

DESCRIPTION OF THE PREFERRED EMBODIMENTS

Figure 1:
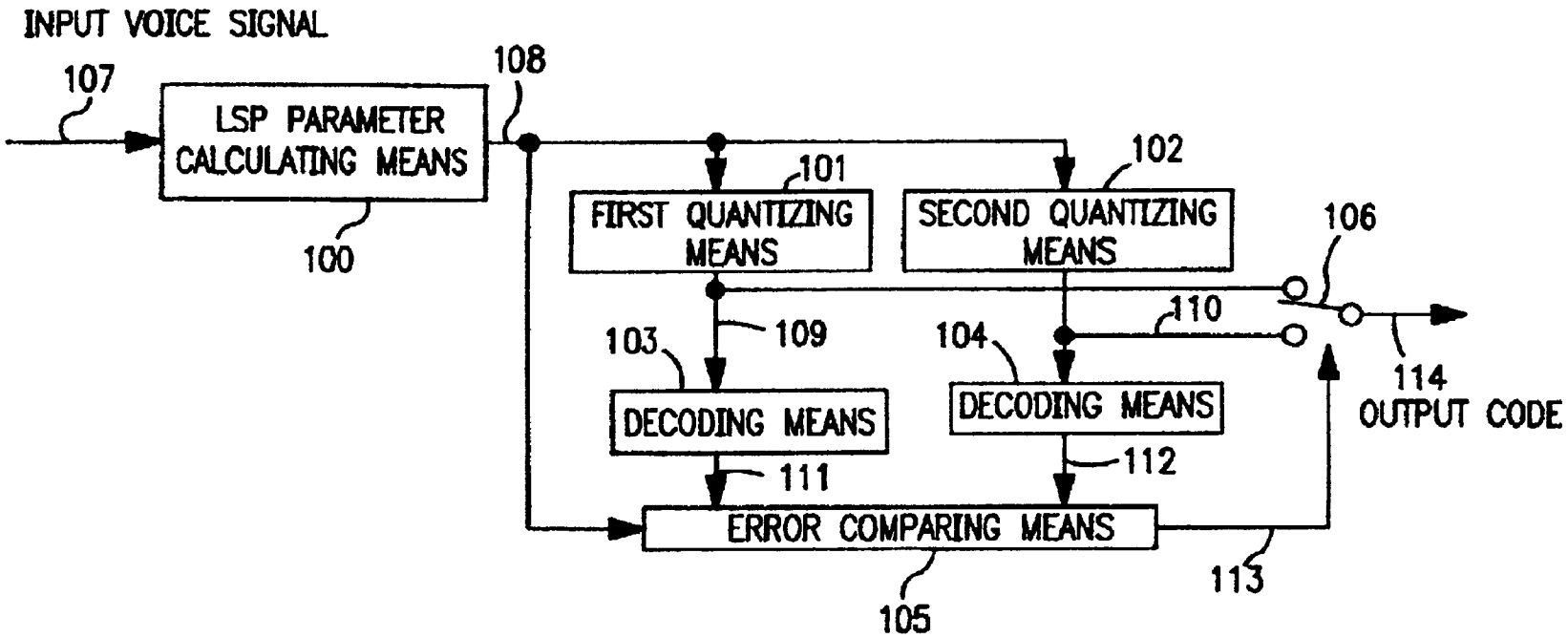
FIG. 1 is a block diagram illustrating a structure of a first exemplary embodiment of an encoding apparatus of LSP parameters of this invention.

FIG. 1 is a block diagram illustrating a structure of a first exemplary embodiment of an encoding apparatus of LSP parameters according to this invention. In FIG. 1, a numeral 100 represents an LSP parameter calculating means, 101: a first quantizing means for quantizing independently in the unit of one frame, 102: a second quantizing means for quantizing by using an correlation between adjacent frames, 103 and 104: decoding means, 105: an error comparing means, 106: a switch for switching the quantizing means, 107: an input voice signal, 108: calculated LSP parameters, 109: an output code of the first quantizing means 101, 110: an output code of the second quantizing means 102, 111: a quantized value produced by the first quantizing means 101, 112: a quantized value produced by the second quantizing means 102, 113: a signal for controlling switch 106, and 114 represents an output code.

An operation of this embodiment is explained here: The LSP parameters 108 calculated by the LSP calculating means 100 are fed into the first and second quantizing means. The first quantizing means 101 performs quantization independently in the unit of one frame and outputs the code 109 The second quantizing means 102 performs quantization by using a correlation between adjacent frames and outputs the code 110. The decoding means 103 decodes the quantized value 111 from the code 109, and the decoding means 104 decodes the quantized value 112 from the code 110. The error comparing means 105 calculates errors of the quantized values 111, 112 and LSP parameters 108, then compares these errors, and selects either one quantizing means which produces less errors by switching the switch 106, finally, outputs an output code of the selected quantizing means as the output code 114 of this encoding apparatus.

Since the second quantizing means 102 performs quantization by using a correlation between adjacent frames, a transmission error influences the next frame and onward. On the other hand, the first quantizing means 101 performs quantization in the unit of frame independently, the errors do not affect the next frame and onward. The influence of errors, therefore, is transmitted only when the second quantizing means is selected in series, and the influence of errors is not transmitted to the frame where the first quantizing means is selected and frames onward. The selecting probability of the first or second quantizing means largely depends on the characteristics of an input voice signal. In normal conversation, the ratio of selecting the first and second quantizing means ranges from 1:1 to 1:2. Either one of two means is hardly selected in series during a long period. The transmission of error-influence is hence limited to a short period, which proves that this invention has a higher resistance to errors than a conventional embodiment where an error influence kept transmitting.

According to this embodiment, a high accurate quantization is achieved regardless the condition of an input voice signal by this way:

1. When a correlation between adjacent frames is small, the first quantizing means is used, wherein quantization is performed in the unit of one frame independently.

2. When a correlation between adjacent frames is large, the second quantizing means is used, wherein quantization is performed by using the correlation between adjacent frames.

Figure 2:
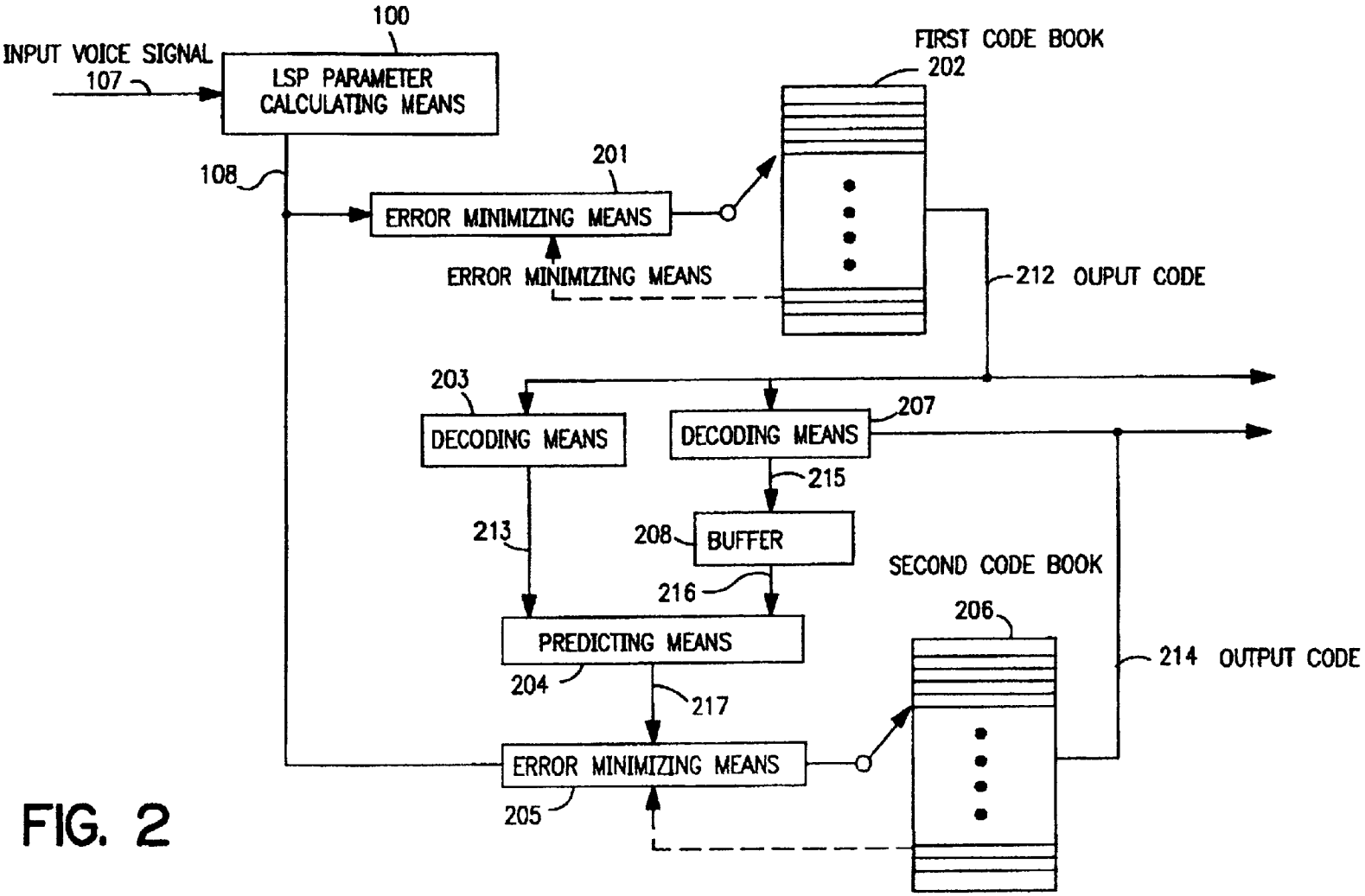
FIG. 2 is a block diagram illustrating a structure of second quantizing means in FIG. 1 more in detail.

FIG. 2 details the second quantizing means 102 illustrated in FIG. 1. The numeral 100 represents the LSP parameter calculating means which is shown in FIG. 1. The numeral 201 represents an error minimizing means in the first step, 202: a first code book, 203 and 207: decoding means, 204: a predicting means for linearly predicting a value of the present frame based on the past quantized values, 206: a second code book, 208: a buffer for storing the past quantized values, 107: an input voice signal, 211: a calculated LSP parameter of the present frame, 212: an output code of the first step, 213: a quantized value in the first step, 214: an output code of the second step, 215: a quantized value of the present frame, 216: past quantized values, 217: a predicted LSP parameter of the present frame.

An operation of this embodiment is explained here: Based on the input voice signal 107, the LSP parameter calculating means 100 calculates the LSP parameter 211 of the present frame. First, the error minimizing means of the first step 201 selects a code from the first code book 202 so that an error between the LSP parameter 211 and the selected code can be minimized, and outputs the code as the output signal 212. Second, the predicting means 204 linearly predicts an LSP parameter of the present frame 217 based on quantized value in the first step 213 which is decoded by the decoding means 203 and the past quantized values 216 which is stored in the buffer 208. The error minimizing means in the second step 205 selects a code from the second code book 206 so that an error between the predicted parameter 217 and LSP parameter of the present frame 108 which is calculated based on the input voice signal 107 can be minimized, and outputs the code as the output signal 214. The decoding means 207 decodes quantized value of the present frame 215 from the output code 214, and stores the decoded value into the buffer 208. The selecting operations in the first and second steps will be explained later.

Figure 3:
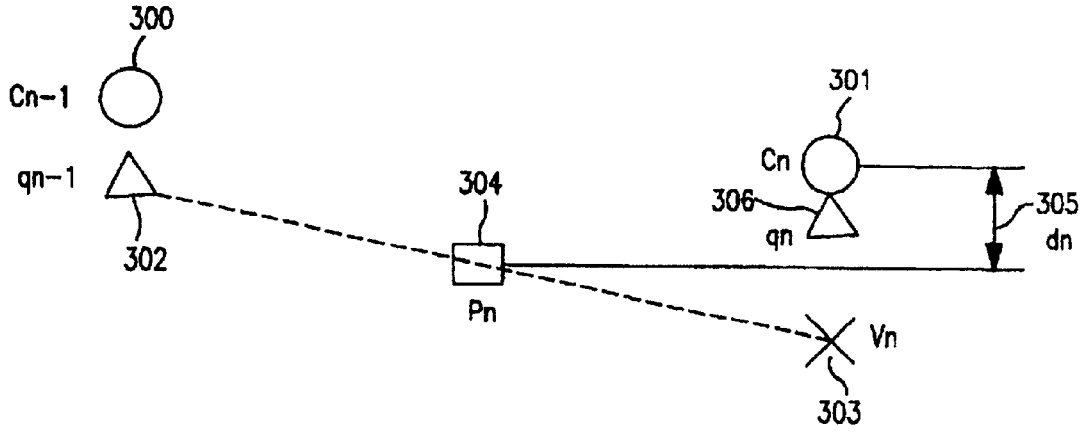
FIG. 3 is a mimic diagram of quantization embodiment showed in FIG. 2 according to this invention.

FIG. 3 details the process of the second step. In FIG. 3, the numeral 300 represents a pre-quantized value of an LSP parameter in the previous frame (cn-l), 301: a pre-quantized value of an LSP parameter in the present frame (an), 302: a quantized value of the previous frame (qn-l), 303: a quantized value of the present frame in the first step (vn), 304: a predicted value of the present frame (pn), 305: an error (dn) between predicted value (pn) and pre-quantized value (an), 306: a quantized value of the present frame.

A predicted value of the present frame 304 can be described as follows: $pn=\alpha(qn-1+(1-\alpha)vn$ Accordingly, error 305 is found as: $dn=cn-pn=cn-\{\alpha qn-1+(1-\alpha)vn\}$, and quantized value of the present frame 306 is found as: $qn=pn+d'n=\{\alpha qn-1+(1-\alpha)vn\}+d'n$ where $\alpha$ is a predicting coefficient, d'n is an approximation of the code vector 305. The error minimizing means 205 in the second step selects a combination of a predicting coefficient $\alpha$ and a code vector d'n from the second code book 206 so that the combination can minimize the error between the LSP parameter 301 of the present frame and the quantized value 306 of the present frame, and then outputs the code.

By fixing predicting coefficient $\alpha$, the error minimizing in the second step can be processed by only selecting a code vector which minimizes an error against the error 305. A number of calculating operation thus can be reduced.

According to this exemplary embodiment, a two-step-structure of the second quantizing means which uses a correlation between adjacent frames can enhance the resistance to transmission errors, namely, in the first step a quantization is performed in the unit of one frame independently and in the second step a quantization is performed by using the correlation between adjacent frames.

Figure 4:
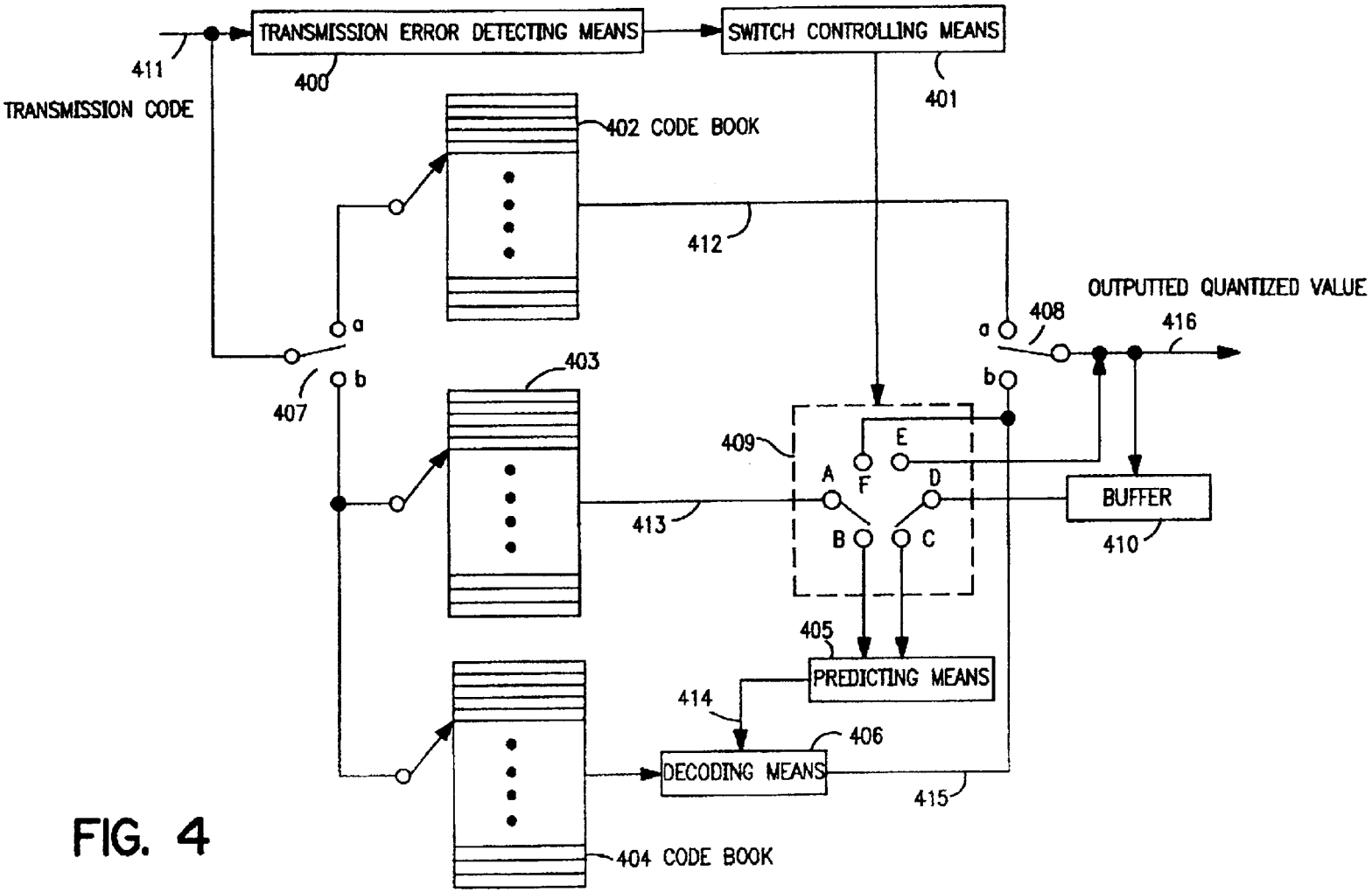
FIG. 4 is a block diagram illustrating a structure of an embodiment of an LSP parameters decoding apparatus of this invention.

FIG. 4 is a block diagram illustrating a structure of the decoding apparatus corresponding to the above encoding apparatus. In FIG. 4, the numeral 400 represents a transmission error detecting means, 401: a switch controlling means, 402: a code book for storing code vectors produced by the first quantizing means, 403: a code book for storing code vectors produced in the first step of the second quantizing means, 404: a code book for storing code vectors produced in the second step of the second quantizing means, 405: a predicting means, 406: a decoding means, 407 and 408: switches for switching decoding means, 409: a switch for switching decoded values being outputted, 410: a buffer for storing a quantized value of a previous frame, 411: a transmission code, 412: a quantized value by the first quantizing means, 413: a quantized value in the first step of the second quantizing means, 414: a predicted value of the present frame, 415: a quantized value in the second step of the second quantizing means, 416: a quantized value being outputted from the decoding apparatus.

The operation of the above decoding apparatus is described here:

A quantized value can be decoded by a decoding means corresponding to the first or second quantizing means: When the transmission code 411 is produced by the first quantizing means of the encoding apparatus, the switches 407 and 408 are switched to side "a". When the transmission code 411 is produced by the second quantizing means of the encoding apparatus, the switches 407 and 408 are switched to side "b". When a frame has no transmission error, the switch controlling means 401 closes two switches of the switch 409, namely A–B and C–D, among 6 terminals (A, B, C, D, E, F). In this condition, decoded values from each decoding means are rightly decoded and outputted. When the transmission error detecting means 400 detects transmission errors, the switch controlling means 401 closes D–E of the switch 409. In this condition, the transmission code 411 is neglected, and the quantized value stored in the buffer 410 is outputted. For the next frame to the error-foundframe and following frames, as far as a code produced by the second quantizing means being kept producing, the switch controlling means 401 closes A–F among the terminals thereof. In this condition, only the quantized value 413 which is decoded by the codes in the first step is outputted, and the quantized value decoded by the second step is neglected. After the next frame to the error-found-frame, for the first frame where a code produced by the first quantizing means, the switch controlling means 401 closes A–B and C–D among the terminals thereof, and restores the switch to a position prior to error-detecting.

According to this exemplary embodiment, the second step of the second quantizing means which carries pasterror-influence is bypassed in the next frame to the error-found-frame and the following frames. The error influence is thus prevented from transmitting to the next frame and onward, and is minimized.

Figure 5:
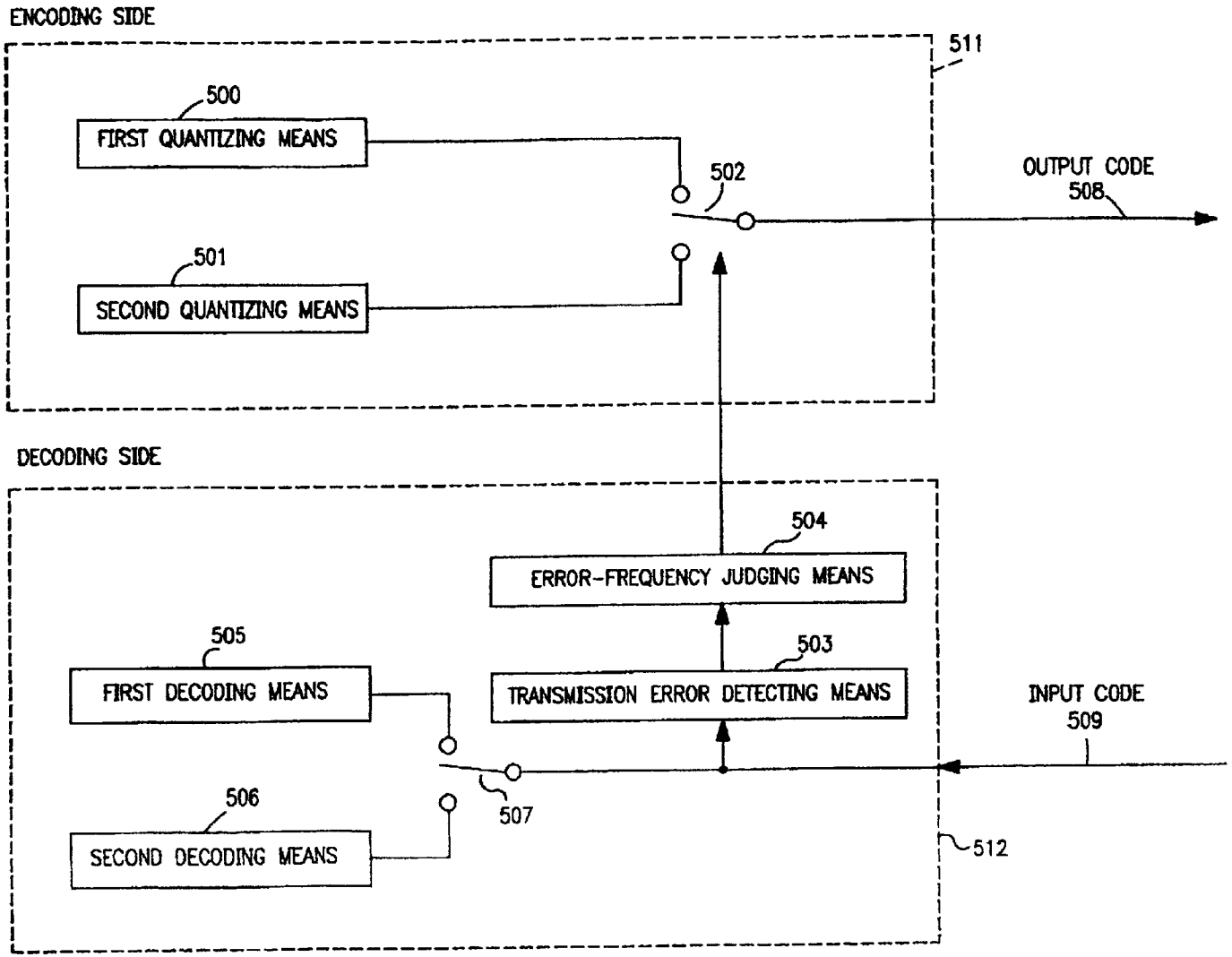
FIG. 5 is a block diagram illustrating an embodiment of an encoding and decoding apparatus of LSP parameters of this invention.

FIG. 5 is a block diagram illustrating a structure of combining the coding and decoding apparatuses. In FIG. 5, the numeral 500 represents the first quantizing means, 501: the second quantizing means, 502: a switch for switching the quantizing means 500 to and from 501. These are mounted to the encoding apparatus 511, 508: an output code. Structures of other devices of the encoding apparatus 511 are detailed in FIG. 1 and FIG. 2.

The numeral 503 represents the transmission error detecting means, 504: an error-frequency judging means, 505: a first decoding means, 506: a second decoding means, 507: a switch for switching the decoding means 507 to/from 506, which corresponds to the switch 407 in FIG. 4. These devices are mounted in the decoding apparatus 512. The numeral 509 represents an input code of the decoding side. The first decoding means 505 uses the code book 402 shown in FIG. 4. The second decoding means 506 comprises the code books 403, 404 shown in FIG. 4, predicting means 405, decoding means 406, switch 409 and buffer 410. Other structure of the decoding means 512 are detailed in FIG. 4.

The operation is explained here: The error detecting means 503 of the decoding side detects transmission errors of the input code 509 transmitted. The errorfrequency detecting means 504 compares a frequency of detected error with a predetermined threshold. When the error-frequency is less than the threshold, the switch 502 selects the first or second quantizing means (500 or 502) whichever has a smaller quantization error. When the error-frequency is not less than the threshold, the switch 502 is fixed at the first quantization means 500. The decoding side operates same as explained in FIG. 4.

When the error-frequency increases, a frequency of bypassing the second quantizing means 501 increases, and an accuracy of decoded quantized-value-lowers. As this exemplary embodiment shows, through monitoring the error-frequency, a switch of the coding side (opponent) is fixed at the first quantization means 500 when the frequency is high, then the accuracy of the decoded quantized-value cannot much lower. On a bidirectional transmission line, the error-frequency of the output code 508 transmitted from the coding side, can be predicted before being received by the opponent based on the error-frequency of the -input code 509 received at the decoding side. As this embodiment shows, when the switch 502 switching the quantizing means at the encoding side based on the error-frequency of the decoding side, is controlled by both this and that sides, the resistance to the transmission errors can be enhanced without any additional information.

This exemplary embodiment thus concludes as follows: When the error-frequency detected by the error detecting means is judged not less than the predetermined threshold, the switch for switching the quantizing means is fixed to the first quantizing means which performs the quantization in the unit of one frame independently. Through this method, influence by the errors is prevented from transmitting, and the resistance to errors is enhanced.

As described above, this invention makes it possible to obtain a high accurate and stable quantization regardless a condition of the input voice signal. The way is to use the switching of two different quantizing means, namely, the first quantizing means which performs quantization independently in the unit of one frame and the second quantizing means which performs quantization by using the correlation between adjacent frames.

When the second quantizing means of this invention is divided into two steps, namely, the first step which performs quantization independently in the unit of one free, and the second step which performs quantization by using the correlation between adjacent frames, the resistance to the transmission errors can be enhanced.

What is claimed:

1. An LSP parameter encoding apparatus comprising:

(a) a first quantizing means for dividing a voice signal into frames of a predetermined length and quantizing LSP parameters of an input voice signal into a vector independently for each frame;

(b) a second quantizing means for quantizing LSP parameters into a vector based on a correlation between adjacent frames;

(c) an error comparing means for comparing quantization errors generated by the first quantizing means and the second quantizing means; and (d) a switch for selecting the quantizing means which produces a smaller quantization error.

2. The LSP parameter encoding apparatus according to claim 1 wherein the second quantizing means comprises:

(a) a first step quantizing means for quantizing LSP parameters of a present frame into a vector independently for each frame;

(b) a second step quantizing means for quantizing a difference between LSP parameters of a present frame and a predicted value of the present frame, said predicted value being predicted based on a quantized value provided by said first step quantizing means and a quantized value of a previous frame.

3. An LSP parameter encoding apparatus according to claim 1, wherein said error comparing means determines which one of i) the first quantizing means and ii) the second quantizing means produces the smallest quantization error and controls said switch to select the quantizing means which produces the smallest quantization error.

4. An LSP parameter encoding apparatus according to claim 1, wherein said error comparing means controls said switch to select one of i) the first quantizing means when a correlation between adjacent frames is smaller than a predetermined value and ii) the second quantizing means when the correlation between the adjacent frames is greater than or equal to the predetermined value.

5. An LSP parameter encoding apparatus according to claim 1, wherein said error comparing means detects transmission errors of the input voice signal and controls said switch to select one of i) the first quantizing means and ii) the second quantizing means based on the detected transmission error.

6. An LSP parameter encoding apparatus according to claim 1, wherein said error comparing means compares a frequency of the detected error with a predetermined frequency threshold and controls said switch to select one of i) the first quantizing means and ii) the second quantizing means based on the frequency of the detected error.

7. An LSP parameter encoding apparatus according to claim 2, wherein said LSP parameters of a predicted value of the present frame are calculated with a linear prediction based on independently quantized LSP parameters in a frame unit in the first step quantizing means and quantized LSP parameters of a past frame are stored in a buffer.

8. An LSP parameter encoding apparatus according to claim 2, wherein said first step quantizing means of the second quantizing means comprises:

i) a first code book for storing a predetermined LSP parameter code;

ii) first error-minimizing means for selecting an LSP parameter code which minimizes an error between a calculated LSP parameter of the present frame and the LSP parameter code from said first code book;

and said second step quantizing means of the second quantizing means comprises:

i) a second code book for storing predetermined prediction coefficients and further LSP parameter codes;

ii) decoding means for decoding the quantized value from said first step quantizing means;

iii) prediction means for linearly predicting a prediction value of the LSP parameter of the present frame based on 1) the decoded quantized value from said decoding means, 2) quantized LSP parameters of a past frame stored in a buffer, and 3) the predetermined prediction coefficient from said second code book; and iv) second error-minimizing means for selecting a pair of i) the prediction coefficient and ii) the LSP parameter code which minimizes an error of a difference between the predicted LSP parameter of the present frame and an unquantized LSP parameter of the present frame and the LSP parameter code from said second code book.

9. An LSP parameter encoding apparatus according to claim 2, wherein said first step quantizing means of the second quantizing means comprises:

i) a first code book for storing a predetermined LSP parameter code;

ii) first error-minimizing means for selecting the predetermined LSP parameter code which minimizes an error between the calculated LSP parameter of the present frame and the LSP parameter code from said first code book; and second step quantizing means of the second quantizing means comprises:

i) a second code book for storing predetermined prediction coefficients and further LSP parameter codes;

ii) decoding means for decoding the quantized value obtained from said first step quantizing means iii) prediction means for linearly predicting the prediction value of the LSP parameter of the present frame based on 1) the quantized value from said decoding means, 2) a quantized LSP parameter of a past frame stored in a buffer, and 3) a predetermined prediction coefficient; and iv) second error-minimizing means for selecting the further LSP parameter code which minimizes an error of the difference between the predicted LSP parameter of the present frame and the unquantized LSP parameter of the present frame and LSP parameter code from said second code book.

10. An LSP parameter decoding apparatus which receives a coded signal from i) a first quantizing means of an encoder for quantizing LSP parameters of an input voice signal into first vectors in a one frame unit independently or ii) a second quantizing means of the encoder for quantizing LSP parameters into second vectors by using a correlation between adjacent frames, said second quantizing means including a first step quantizing means for quantizing LSP parameters of a present frame into the second vectors in the one frame unit independently, and a second step quantizing means for quantizing a difference between the LSP parameters of the present frame and a predicted value of the present frame, said predicted value based on [a] quantized value*s* by said first step quantizing means and a quantized value of the adjacent frames, said decoding apparatus comprising:

error detecting means for detecting errors produced in quantization codes on a transmission line; and decoding means for outputting a decoded quantized value when a code of a further frame next to an error frame is produced by said first quantizing means and for outputting a decoded value from said first step quantizing means of said second quantizing means when the code of the further frame next to the error frame is produced by said second quantizing means.

11. An LSP parameter decoding apparatus according to claim 10, further comprising:

first output means for outputting the decoded output of the first quantizing means;

second output means for outputting a decoded first step output of said second quantizing means;

third output means for outputting a decoded second step output of said second quantizing means;

buffer means for storing a quantized LSP parameter of a past frame;

prediction means for predicting the LSP parameter of the present frame based on the LSP parameter from said second output means and the LSP parameter from said buffer means;

switching means for selecting one output of said decoding means;

switch control means for controlling said switching means in response to an output signal from said error detecting means;

means for one of i) connecting said first output means and said one output of said decoding means, and ii) connecting said third output means and said one output of said decoding means in response to received coded signals to output a decoded LSP parameter on a frame not detecting an error, means for connecting said buffer means and said one output of said decoding means independently of received coded signals to output quantized LSP parameter of past frame on a frame detecting an error; and means for connecting said first output means and said one output of said decoding means in response to the received coded signals to output a decoded LSP parameter on the further frame next to said frame detecting an error when the received coded signal is the coded signal from the first quantizing means of said encoder; and means for connecting said second output means and said one output of said decoding means in response to the received coded signals to output a decoded LSP parameter by using only the first step codes on the next frame of said frame detected an error when the received coded signal is the coded signal from the second quantizing means of said encoder.

12. An LSP parameter encoding and decoding apparatus for use with input voice signals, said apparatus including an LSP parameter encoder and an LSP decoder connected at one end of a two-way communication path, said LSP encoder comprising:

i) allocating means for dividing the input voice signal from said two-way communication path into frames of a predetermined length and allocating LSP parameters of the input voice signals in each of said frames;

ii) first quantizing means for independently quantizing said allocated LSP parameters into a vector in a one frame unit;

iii) second quantizing means for quantizing said allocated LSP parameters into vectors by using a correlation between adjacent frames;

iv) error comparing means for comparing quantization errors between the first quantizing means and the second quantizing means; and v) switch means for selecting one of the first quantizing means and the second quantizing means based on which produces a smaller error, and said LSP decoder comprising:

i) error detecting means for detecting transmission errors of an input code; and ii) judging means for determining whether an error-detecting frequency detected by said error detecting means is less than a predetermined threshold;

wherein said switch means selects one of said first quantizing means and said second quantizing means based on which has fewer quantization errors when the error-detecting frequency detected by said judging means is less than the predetermined threshold, and said switch means is fixed to said first quantizing means when said error-detecting frequency is not less than the predetermined threshold.

*13. An LSP parameter decoding apparatus which receives a coded signal from*

*i) a first quantizing means of an encoder for quantizing LSP parameters of an input voice signal into first vectors in a one frame unit independently or*

*ii) a second quantizing means of the encoder for quantizing LSP parameters into second vectors by using a correlation between a present frame and a previous frame, said second quantizing means including a first step quantizing means for quantizing LSP parameters of the present frame into the second vectors in the one frame unit independently, and a second step quantizing means for quantizing a difference between the LSP parameters of the present frame and a predicted value of the present frame, said predicted value based on a quantized value by said first step quantizing means and a quantized value of the previous frame, said decoding apparatus comprising:*

*error detecting means for detecting errors produced in quantization codes on a transmission line; and*

*decoding means for outputting a decoded quantized value when a code of a further frame next to an error frame is produced by said first quantizing means and for outputting a decoded value from said first step quantizing means of said second quantizing means when the code of the further frame next to the error frame is produced by said second quantizing means.*

*14. An LSP parameter decoding apparatus which receives a coded signal from*

*i) a first quantizing means of an encoder for quantizing LSP parameters of an input voice signal into first vectors in a one frame unit independently or*

*ii) a second quantizing means of the encoder for quantizing LSP parameters into second vectors by using a correlation between a present frame and a adjacent previous frame, said second quantizing means including a first step quantizing means for quantizing LSP parameters of the present frame into the second vectors in the one frame unit independently, and a second step quantizing means for quantizing a difference between the LSP parameters of the present frame and a predicted value of the present frame, said predicted value based on a quantized value by said first step quantizing means and a quantized value of the adjacent previous frame, said decoding apparatus comprising:*

*error detecting means for detecting errors produced in quantization codes on a transmission line; and*

*decoding means for outputting a decoded quantized value when a code of a further frame next to an error frame is produced by said first quantizing means and for outputting a decoded value from said first step quantizing means of said second quantizing means when the code of the further frame next to the error frame is produced by said second quantizing means.*

* * * * *

UNITED STATES PATENT AND TRADEMARK OFFICE

CERTIFICATE OF CORRECTION

PATENT NO. : RE 40,968 E
APPLICATION NO. : 09/948181
DATED : November 10, 2009
INVENTOR(S) : Naoya Tanaka It is certified that error appears in the above-identified patent and that said Letters Patent is hereby corrected as shown below:

At Column 8, line 39, "and a quantized value" should read --and quantized values--

At Column 10, claim 13 is cancelled

At Column 10, line 39, "and a adjacent" should read --and an adjacent--

Signed and Sealed this

Twenty-seventh Day of July, 2010

David J. Kappos

David J. Kappos
*Director of the United States Patent and Trademark Office*